(12) United States Patent
Bonnet et al.

(10) Patent No.: US 12,012,231 B2
(45) Date of Patent: Jun. 18, 2024

(54) METHOD FOR MONITORING AT LEAST ONE AIRCRAFT ENGINE

(71) Applicant: SAFRAN AIRCRAFT ENGINES, Paris (FR)

(72) Inventors: Guillaume Rémi Bonnet, Moissy-Cramayel (FR); Josselin Xavier Coupard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 305 days.

(21) Appl. No.: 17/593,785

(22) PCT Filed: Mar. 16, 2020

(86) PCT No.: PCT/FR2020/050550
§ 371 (c)(1),
(2) Date: Sep. 24, 2021

(87) PCT Pub. No.: WO2020/201652
PCT Pub. Date: Oct. 8, 2020

(65) Prior Publication Data
US 2022/0185502 A1 Jun. 16, 2022

(30) Foreign Application Priority Data
Apr. 1, 2019 (FR) ...................... 1903464

(51) Int. Cl.
*B64F 5/60* (2017.01)
*B64D 45/00* (2006.01)
*F02C 6/20* (2006.01)

(52) U.S. Cl.
CPC ............... *B64F 5/60* (2017.01); *B64D 45/00* (2013.01); *F02C 6/20* (2013.01);
(Continued)

(58) Field of Classification Search
CPC ... B64F 5/60; B64D 45/00; B64D 2045/0085; B64D 33/00; F05D 2270/11;
(Continued)

(56) References Cited

U.S. PATENT DOCUMENTS 7,403,850 B1 * 7/2008 Boutin .................. G01M 15/05
701/107
8,781,982 B1 * 7/2014 Das ........................ G06N 3/084
706/21
(Continued)

FOREIGN PATENT DOCUMENTS

CN 102227691 A 10/2011
CN 103370667 A 10/2013
(Continued)

OTHER PUBLICATIONS

International Search Report issued in International Application No. PCT/FR2020/050550 dated Jun. 22, 2020 (4 pages).
(Continued)

*Primary Examiner* — Mussa A Shaawat
(74) *Attorney, Agent, or Firm* — Bookoff McAndrews, PLLC

(57) ABSTRACT

The invention relates to a method for monitoring at least one aircraft engine, said method including an acquisition (100) according to the first and second sets of measurements of respectively endogenous and exogenous variables. The method also includes:
- a normalization (200) of the measurements of the first set relative to the measurements of the second set,
- a generation (300) of a current model representative of the evolution of the behavior of the engine based on the normalized measurements,
- a detection (400) of potential abnormality in the behavior of the engine based on a comparison of the current model with a reference model, (Continued)

a generation (500) of a maintenance message, a transmission (600) of said ground message, the acquisition, normalization, generation of a current model, the detection and generation of a maintenance message being made on board the aircraft.

18 Claims, 3 Drawing Sheets

(52) U.S. Cl.
CPC .. *B64D 2045/0085* (2013.01); *F05D 2270/11* (2013.01); *F05D 2270/44* (2013.01)

(58) Field of Classification Search
CPC ............ F05D 2270/44; F05D 2260/80; G05B 23/0243; G05B 23/0283; G05B 2219/45071; F02C 9/00

See application file for complete search history.

(56) References Cited

U.S. PATENT DOCUMENTS

| | | | | |
|---|---|---|---|---|
| 10,174,863 | B2* | 1/2019 | Bense | F16K 37/0091 |
| 10,359,339 | B2* | 7/2019 | Gerez | G01M 15/05 |
| 11,521,430 | B2* | 12/2022 | Tran | G08B 21/182 |
| 2008/0082229 | A1* | 4/2008 | Wingenter | G01M 17/00 |
| | | | | 701/34.4 |
| 2009/0229272 | A1* | 9/2009 | Feeney | G07C 5/0816 |
| | | | | 60/778 |
| 2010/0063674 | A1* | 3/2010 | Karolak | G01M 15/05 |
| | | | | 702/113 |
| 2010/0155634 | A1* | 6/2010 | do Amaral | G05B 23/0237 |
| | | | | 73/1.72 |
| 2011/0245999 | A1* | 10/2011 | Kordonowy | G05D 1/0066 |
| | | | | 701/31.4 |
| 2012/0215509 | A1* | 8/2012 | Callot | G05B 23/0243 |
| | | | | 702/34 |
| 2012/0221193 | A1* | 8/2012 | Delaye | G05B 23/0283 |
| | | | | 701/31.9 |
| 2013/0197747 | A1* | 8/2013 | Tourin | F01D 21/04 |
| | | | | 701/34.4 |
| 2013/0211768 | A1* | 8/2013 | Gerez | G01M 15/02 |
| | | | | 702/113 |
| 2013/0239653 | A1* | 9/2013 | Nicq | G01N 3/30 |
| | | | | 73/12.01 |
| 2013/0325286 | A1* | 12/2013 | Lacaille | G05B 23/0283 |
| | | | | 701/99 |
| 2016/0005242 | A1* | 1/2016 | Hua | G06F 11/2294 |
| | | | | 714/25 |
| 2016/0197565 | A1* | 7/2016 | Kaeser | B60L 3/0023 |
| | | | | 318/490 |
| 2016/0233948 | A1 | 8/2016 | Le Bigot et al. | |
| 2016/0240017 | A1* | 8/2016 | Lacaille | G07C 5/0841 |
| 2017/0144778 | A1* | 5/2017 | Brookhart | B64F 5/60 |
| 2017/0183107 | A1* | 6/2017 | Brookhart | G07C 5/0808 |
| 2017/0315021 | A1* | 11/2017 | Nicq | G01H 3/08 |
| 2017/0352205 | A1* | 12/2017 | Lacaille | F01D 21/003 |
| 2018/0306666 | A1* | 10/2018 | Coupard | G07C 5/004 |
| 2019/0382128 | A1* | 12/2019 | Prost | G01N 29/2481 |
| 2020/0066061 | A1* | 2/2020 | Tran | F02C 7/00 |
| 2020/0277072 | A1* | 9/2020 | Zoppitelli | B64D 27/02 |

FOREIGN PATENT DOCUMENTS

| | | |
|---|---|---|
| CN | 106597938 A | 4/2017 |
| CN | 107463161 A | 10/2021 |
| FR | 2971595 A1 | 8/2012 |

OTHER PUBLICATIONS

Search Report issued in French Application No. FR1903464 dated Feb. 17, 2020 (2 pages).

First Notice of Examination Opinion issued in corresponding Chinese Application No. 202080026197.X, issued Jun. 22, 2023.

First Search issued in corresponding Chinese Application No. 202080026197.X, issued Jun. 22, 2023.

* cited by examiner

METHOD FOR MONITORING AT LEAST ONE AIRCRAFT ENGINE

CROSS-REFERENCE TO RELATED APPLICATION(S)

This patent application is the U.S. National Stage entry under 35 U.S.C. § 371 of International Patent Application No. PCT/FR2020/050550, filed on Mar. 16, 2020, which claims the benefit of priority to French Patent Application No. 1903464, filed on Apr. 1, 2019.

PRIOR ART

The present invention belongs to the field of the aeronautical maintenance support. It relates more particularly to a method for monitoring at least one aircraft engine from measurements acquired during a flight mission of the aircraft and representative of the behavior of the engine as well as of the acquisition context. The invention finds a particularly advantageous application, although without limitation, within the framework of predictive maintenance services performed by an aircraft engine manufacturer.

A systematic implementation of predictive maintenance services is observed today. In this way, engine manufacturers are looking to best anticipate failures that could affect engines fitted to aircrafts. The implementation of these services has further accelerated since the arrival on the civil aviation market of flight-hour contracts.

These predictive maintenance services are essentially based on measurements acquired during one or more aircraft flight missions and representative not only of the behavior of an engine but also of the acquisition context encountered by this engine during a flight mission. More particularly, logistical and material needs useful to carry out the maintenance services are proposed from an analysis of said measurements.

By way of example, the measurements representative of the behavior of the engine can relate to different variables, such as a speed of rotation of a turbine shaft, a pressure and/or a temperature and/or an oil level in an oil circuit, a fuel flow rate, an exhaust gas temperature, etc. The measurements representative of the acquisition context may for their part relate to other variables, such as weather, piloting, engine aging, airplane weight, etc.

Conventionally, said measurements are acquired by acquisition means on board an aircraft, and made available to a receiving device on the ground held by the aircraft manufacturer, in order to be analyzed. This availability is made either during the flight mission, typically by transmission via a satellite link, or after landing by unloading a memory in which said measurements have been stored.

In case of abnormalities detected based on the measurements made available, maintenance operations are immediately proposed by a maintenance operator. Otherwise, the measurements are archived with all the data of the fleet, an operator being possibly able to propose predictive maintenance operations to the aircraft manufacturer in order to correct possible non-critical defects, so as to optimize the operation of the engine and extend its service life.

Such strategy for providing the maintenance services however cannot be considered as satisfactory. Indeed, although the maintenance operations are determined in part by means of information relating to the condition of the engine and obtained from dedicated algorithms, they still require manual operation on the ground by expert operators in order to achieve required relevance and accuracy. Such procedure is tedious and, depending on the difficulty of the abnormalities to be treated, presents a risk that the recommended maintenance operations will be communicated late, thus generating delays in the maintenance and therefore in the operation of the fleet of an aircraft manufacturer.

In addition, this delay may increase depending on the amount of measurements to be analyzed, insofar as the more substantial it is, the more time consuming the availability that results from it.

DISCLOSURE OF THE INVENTION

The present invention aims at overcoming all or part of the drawbacks of the prior art, in particular those set out above, by proposing a solution that allows accurately monitoring at least one engine of an aircraft, while being less tedious and faster than the solutions of the prior art. This solution thus allows providing very quickly information relating to the health of the engine, as well as maintenance operations to be implemented.

To this end, and according to a first aspect, the invention relates to a method for monitoring at least one aircraft engine, said method including, during at least one flight mission of the aircraft, a step of acquiring measurements according to two sets, a first set of measurements of endogenous variables representative of the behavior of the engine, and a second set of measurements of exogenous variables representative of the acquisition context. In addition, said method includes, during the flight mission, the following steps:

- a step of normalizing the measurements of the first set relative to the measurements of the second set,
- a step of generating a current model representative of the time evolution of the behavior of the engine based on the normalized measurements,
- a step of detecting at least one potential abnormality in the behavior of the engine based on a comparison of the current model with a predefined reference model representative of the behavior of the engine free of abnormality, and
- if an abnormality is detected, a step of generating a maintenance message including an alert based on the detected abnormality as well as maintenance recommendations or maintenance operations or service orders associated with said alert,
- a step of transmitting the maintenance message to at least one receiving device on the ground, the steps of acquiring, normalizing, generating a current model, of detecting and generating a maintenance message being carried out on board the aircraft.

Thus, the monitoring method carries out all the steps preceding the transmission of the maintenance message on board the aircraft. Such procedure advantageously allows eliminating the tedious nature of the generation of said maintenance message on the ground from the acquired measurements. Indeed, once the maintenance message has been transmitted, all that remains is to take note of its content. Consequently, a maintenance operator directly receives the maintenance operations to be applied, thus completely eliminating the time limits generated in the prior art for the availability of this information, which ultimately accelerates considerably the maintenance process of the engine of the aircraft.

The maintenance operations are conventionally associated with the equipment required in order to implement them. Consequently, an additional advantage of the monitoring method according to the invention is to allow for an anticipated logistic programming before the aircraft is immobilized on the ground, thus avoiding any unnecessary loss of time.

In particular modes of implementation, the monitoring method may further include one or more of the following characteristics, taken in isolation or in any technically possible combinations.

In particular modes of implementation, the normalization step includes:
- a selection and/or a filtering of the measurements of the first set, so as to remove outlier measurements located outside predetermined respective intervals,
- a normalization of the filtered measurements of the first set relative to the measurements of the second set.

Such filtering advantageously allows making the measurements of the first set more reliable, and therefore ultimately making the whole monitoring method more reliable.

In particular modes of implementation, the reference model has been determined based on M current models obtained during flight missions prior to the considered flight mission and during which no abnormality has been detected, for example during flight missions following the start-up of the engine, M being a number greater than or equal to 1.

In particular modes of implementation, when M is strictly greater than 1, the reference model is determined based on a mean, a median or a weighting of said M previous current models.

In this way, it is possible to advantageously take into account the aging of the engine as long as the latter is intact, and therefore to have a reference model which finely models the evolution of the condition of the engine.

In particular modes of implementation, the step of detecting at least one potential abnormality includes:
- a determination of a trend of evolution of the current model,
- a comparison of the trend of evolution of the current model with the time evolution of the reference model, so as to identify a potential deviation of the current model with the reference model,
- a detection of at least one abnormality based on said potential deviation.

Such implementation is advantageous because it allows, thanks to the determination of the trend of evolution of the current model, detecting potential future abnormalities. In other words, according to such provisions, the method falls within a framework of predictive maintenance.

In particular modes of implementation, when an abnormality is detected, said method includes, before the generation of the maintenance message, a step of confirming and/or materially isolating said abnormality comprising exchanges of information relating to the current model between the aircraft and an entity on the ground.

Such interactions between the entity on the ground, preferably managing a maintenance operator belonging to the engine manufacturing company or to a company in charge of operating said engine, and the aircraft, allow reducing the rate of false detections by deepening the analysis of the detected abnormality.

In particular modes of implementation, the receiving device on the ground is chosen among at least: a PC, a Smartphone, a tablet, a drone, augmented reality glasses.

Such receiving device on the ground is easily to handle, and can advantageously be transported/carried/guided by a maintenance operator on an intervention site. Thus, the operator can take note of the maintenance information before the aircraft returns from its mission, and thus prepare in advance the equipment that may be necessary for the execution of maintenance operations.

In particular modes of implementation, the maintenance message is also transmitted to display means of the cockpit of the aircraft.

In particular modes of implementation, the method includes, when an abnormality has been detected and when a message including at least one maintenance operation relating to said abnormality has been generated, a step of estimating the impact of the absence of tracking of said maintenance operation on the fuel consumption of the engine.

Such estimation, when transmitted to the receiving device on the ground, allows a maintenance operator to determine whether to actually envisage the maintenance operation as recommended in the maintenance message. In other words, said estimation constitutes a decision support for the maintenance operator.

In particular modes of implementation, at least the steps of normalizing, generating a current model and of detecting at least one potential abnormality are iterated for each acquisition of a measurement of at least the first set.

In particular modes of implementation, a plurality of flight missions is considered, the measurements of the first and second sets associated with a flight mission being acquired during at least one predetermined phase common to said plurality of flight missions.

In this way, the measurement acquisition context is harmonized, thus facilitating the tracking of the condition of the engine from flight to flight. In other words, targeting a specific phase of the flight mission allows creating a repeatable context between different flight missions of the aircraft.

In particular modes of implementation, said method is executed periodically every N flight missions, N being a number greater than or equal to 1.

In particular modes of implementation, the aircraft includes at least one pair of identical engines, at least the steps of acquiring, normalizing, generating a current model, of detecting at least one potential abnormality, of generating a maintenance message and of transmitting said message being executed for each engine of the pair, the step of detecting at least one potential abnormality associated with an engine further including a comparison of the current models respectively associated with the engines of the pair.

Comparing together the respective current models of the engines allows increasing the reliability of the final diagnosis provided in the maintenance messages for each of the engines.

According to a second aspect, the invention relates to a computer program including a set of program code instructions which, when executed by a processor, configure said processor to implement steps of normalizing, generating a current model, of detecting at least one potential abnormality and of generating a maintenance message of a monitoring method according to the invention.

According to a third aspect, the invention relates to a computer-readable recording medium on which a computer program according to the invention is recorded.

According to a fourth aspect, the invention relates to a processing device intended to be on board an aircraft including acquisition means configured to acquire, during at least one flight mission, measurements according to two sets, a first set of measurements of endogenous variables representative of the behavior of an engine of the aircraft, and a second set of measurements of exogenous variables representative of the acquisition context. In addition, said processing device includes:

a normalization module configured to normalize the measurements of the first set relative to the measurements of the second set, a generation module configured to generate a current model representative of the time evolution of the behavior of the engine based on the normalized measurements, a detection module configured to detect at least one potential abnormality in the behavior of the engine based on a comparison of the current model with a predefined reference model representative of the behavior of the engine free of abnormality, a generation module configured to generate a maintenance message including an alert based on a detected abnormality as well as maintenance recommendations or maintenance operations or service orders associated with said alert.

According to a fifth aspect, the invention relates to a system for monitoring at least one aircraft engine, said system including:

acquisition means intended to be on board the aircraft and configured to acquire, during at least one flight mission, measurements according to two sets, a first set of measurements of endogenous variables representative of the behavior of the engine, and a second set of measurements of exogenous variables representative of the acquisition context, a processing device according to the invention, at least one receiving device on the ground, communication means configured to at least transmit a maintenance message generated by the processing device to the receiving device on the ground.

According to a sixth aspect, the invention relates to an aircraft including:

acquisition means configured to acquire, during at least one flight mission, measurements according to two sets, a first set of measurements of endogenous variables representative of the behavior of the engine, and a second set of measurements of exogenous variables representative of the acquisition context, a processing device according to the invention, communication means configured to at least transmit a maintenance message generated by the processing device to at least one receiving device on the ground.

BRIEF DESCRIPTION OF THE DRAWINGS

Other characteristics and advantages of the present invention will emerge from the description given below, with reference to the appended drawings which illustrate an exemplary embodiment thereof without any limitation. In the figures.

DESCRIPTION OF THE EMBODIMENTS

Figure 1:
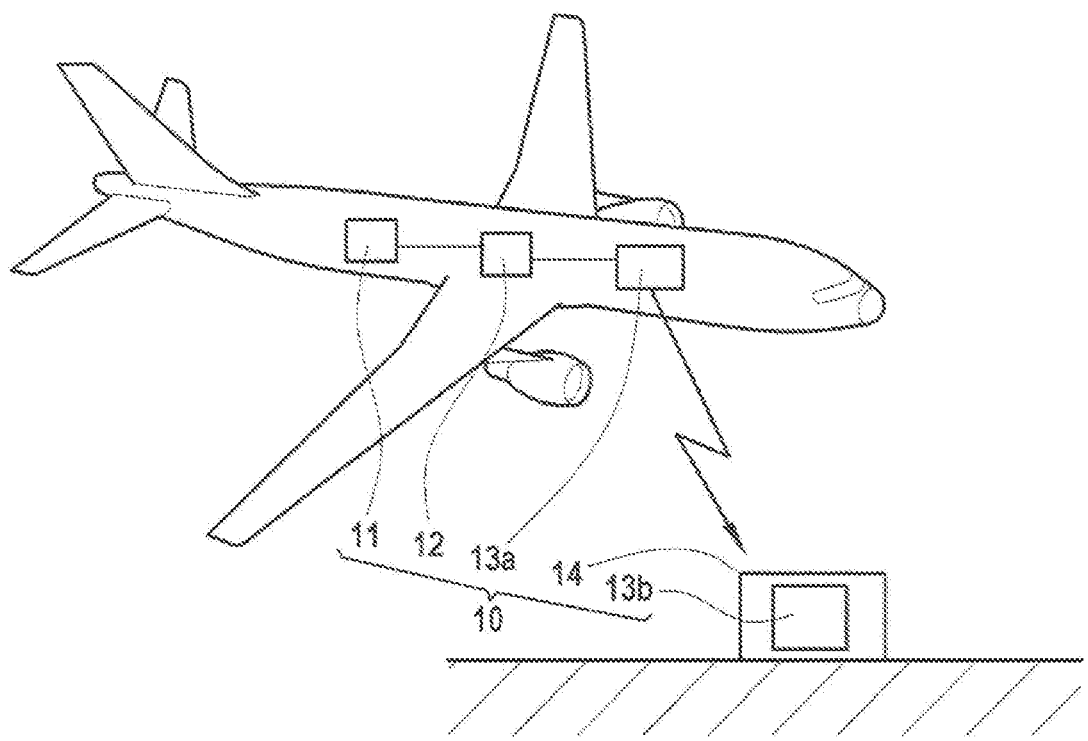
FIG. 1 schematically represents one exemplary embodiment of a monitoring system according to the invention of at least one engine of an aircraft.

FIG. 1 schematically represents one exemplary embodiment of a system 10 for monitoring at least one engine of an aircraft.

The remainder of the description relates more specifically, but without limitation, to an airplane-type aircraft equipped with a pair of identical engines of the turbine engine type such as, for example, turboprop engines.

However it is not excluded, according to other examples not detailed here, to consider other types of turbine engines, such as for example a turbojet engine, but also, and more generally, engines which are not turbojet engines, such as piston engines. The invention is indeed applicable to any type of engine whose operation it is desired to be monitored. It is also not excluded to consider an aircraft of another type, such as a helicopter for example.

Furthermore, it should be noted that no limitation is related to the number of pairs of identical engines on the aircraft. For example, the aircraft can include two pairs of engines, so as to be equipped with a total of four engines which can either all be identical to each other (in other words the pairs are identical to each other), or correspond to two pairs that are different from each other, the engines within the same pair being nevertheless identical to each other. Finally, it is not excluded that the aircraft also includes, in addition to one or more pairs of identical engines, one or more engines which, considered individually, differ from all the other engines.

In addition, and in order to simplify the description, a monitoring made for one of the engines of the pair is first considered. The way this monitoring is extended to all engines of the aircraft is discussed later.

The monitoring system 10 includes acquisition means 11 on board the aircraft and configured to acquire, during at least one flight mission, measurements according to two sets.

"Flight mission" refers here to the time range during which the aircraft is operating. Consequently, a flight mission covers both the taxi phases before and after landing, the cruising phase, but also the phases during which the aircraft has not yet left its parking lot before take-off or has already reached its parking lot after landing, its engines being nonetheless running.

Unless otherwise stated, the remainder of the description seeks to describe the invention during a single flight mission. However, it is not excluded to consider a plurality of flight missions, as will be discussed later.

The two sets of measurements correspond respectively to a first set of measurements of endogenous variables representative of the behavior of the engine, and to a second set of measurements of exogenous variables representative of the acquisition context.

By way of non-limiting example, the endogenous variables comprise the speed of rotation of a turbine shaft, such as for example a shaft N2, the fuel flow rate in the engine, the temperatures and/or pressures and/or levels of fluids at different locations of the engine (for example, before and/or after compression), the Exhaust Gas Temperature EGT, etc.

However it is not excluded, according to other examples not detailed here, to consider other endogenous variables as long as they are representative of the behavior of at least part of the engine during the flight mission.

The exogenous variables, for their part, comprise for example the outside temperature, the altitude, the weight of the airplane, the speed of the aircraft, etc.

Here again, it is not excluded, according to other examples not detailed here, to consider other exogenous variables as long as they are representative of the context in which the measurements of the first set are acquired.

It is therefore understood that each of said two sets include measurements acquired over time and relating to one or more variables. In this way, each set of measurements can be seen as a multidimensional set whose dimension depends on the number of considered endogenous/exogenous variables as well as on the number of measurements for each of these variables.

Conventionally, the acquisition means 11 include at least one sensor dedicated to the measurement of each endogenous/exogenous variable. With regard to the endogenous variables, the associated sensors are integrated into the engine. For example, in the case of a variable corresponding to an oil level, a resistive sensor with discrete resolution is implemented in a tank of the oil circuit of the engine. According to another example, in the case of a variable corresponding to an oil temperature, a temperature probe is implemented in said tank, etc.

Such sensors, whether they are dedicated to measurements of endogenous or exogenous variables, can be chosen and placed in the aircraft based on the considered variable.

When measurements have been acquired by the acquisition means 11 according to said two sets, these measurements are transmitted, for example by wired or wireless means, and according to any transmission protocol chosen for this purpose, between said acquisition means 11 and a processing device 12. Once these measurements have been received by the processing device 12, the latter can carry out processing operations aiming at monitoring the engine considered among the pair of engines of the aircraft, by implementing part of a method for monitoring said engine.

The processing device 12 includes for example one or more processors and storage means (magnetic hard disk, electronic memory, optical disc, etc.) in which data and a computer program are stored, in the form a set of program code instructions to be executed in order to implement part of the steps of the monitoring method.

Alternatively or in addition, the processing device 12 also includes one or more programmable logic circuits, of the FPGA, PLD type, etc., and/or specialized integrated circuits (ASIC), and/or a set of discrete electronic components, etc. adapted to implement part of the steps of the monitoring method.

In other words, the processing device 12 includes a set of means configured in software (specific computer program) and/or hardware (FPGA, PLD, ASIC, etc.) to implement different steps of the monitoring method.

It should be noted that the processing device 12 is also part of the monitoring system 10 and is on board the aircraft. For example, the processing device 12 is integrated into the monitored engine.

It should also be noted that the choice of such integration into the engine constitutes only one variant of the invention. For example, said processing device 12 can be installed remotely from the monitored engine. In general, the choice of the location of the processing device 12 results from a compromise between, on the one hand, practicality of installation and dimensioning of the engine in case of integration into the engine and, on the other hand, isolation of the processing device 12 from disturbances, for example of the vibratory type, generated by the engine in case of remote installation from the engine. This compromise can also take into account the distance separating the processing device 12 from the monitored engine in the case where the acquired measurements are transmitted by means of a wireless communication network.

The monitoring system 10 further includes at least one receiving device 14 on the ground as well as communication means configured to exchange data between the aircraft and said at least one receiving device 14 on the ground.

By way of non-limiting example, said communication means comprise ACARS (Airline Communications, Addressing and Reporting System) units 13a, 13b, respectively fitted to the aircraft and the receiving device 14 on the ground, and configured to communicate according to the ARINC (Aeronautical Radio Incorporated) standard. It is noted that the ACARS unit 13a fitted to the aircraft can be integrated into the processing device 12.

The choice of a communication by means of ACARS units 13a 13b constitute only one variant of the invention. Thus, no limitation is related to the choice of said communication means, which can be wireless and use any dedicated communication network, such as for example Wifi, 3G, 4G, 5G, Bluetooth, Satellite, Lifi, etc., or wired, in the case of an Ethernet-type network.

Of course, said communication means can be integrated into the processing device 12 and/or into the receiving device 14. Alternatively, the communication means communicate with these devices without being integrated therein. In other words, the communication means are distributed between the aircraft and the ground, their integration at these two localities not being a limiting factor of the invention.

It is understood that the choice of communication means depends, in particular, on the distance separating the aircraft from the receiving device 14 on the ground. In other words, this choice depends on the moment during which the monitoring method is executed during the flight mission.

The receiving device 14 on the ground is configured to receive data generated by the processing device 12 when the latter executes steps of the monitoring method. These data are contained in maintenance messages, as detailed later, all or part of these data being intended to be transmitted to a maintenance operator, such as for example a salaried technician belonging to the company in charge of manufacturing the engine, also called engine manufacturer, or to a company in charge of operating said engine, in the case where maintenance operations are to be envisaged, as well as preferably to the aircraft manufacturer who owns the aircraft.

For example, the receiving device 14 on the ground is chosen among at least a PC, a smartphone, a tablet, held by a maintenance operator of the engine manufacturer, so that this operator can easily take note of the transmitted data and act accordingly to ensure the maintenance. To this end, such receiving devices 14 advantageously include storage means in which a documentation of the maintenance operations to be applied is stored based on the data which have been generated by the processing device 12.

Other types of receiving devices 14 can be envisaged for the maintenance operator, possibly in addition to a PC, a Smartphone or a tablet.

Thus, according to a particular example, the receiving device 14 is a drone. Such drone advantageously allows assisting the maintenance operator, or carrying out an entire maintenance operation, such as for example an endoscopy or an analysis of a photo of a specific part of the engine.

According to yet another particular example, the receiving device 14 is a pair of augmented reality glasses, also called virtual reality headset, which are intended to be worn by the maintenance operator and in which a modeling of the maintenance operations to be carried out are projected.

In the case where the data generated by the processing device 12 are also transmitted to the aircraft manufacturer, they are typically transmitted to a ground station in premises owned by the aircraft manufacturer, these premises being themselves located, for example, at an airport. In this way, the aircraft manufacturer can take note of the results of the monitoring made by the processing device 12, and thus update the operating state of his aircraft, so as to carry out an accurate tracking thereof, and more widely of its entire fleet when several aircrafts are considered.

Figure 2:
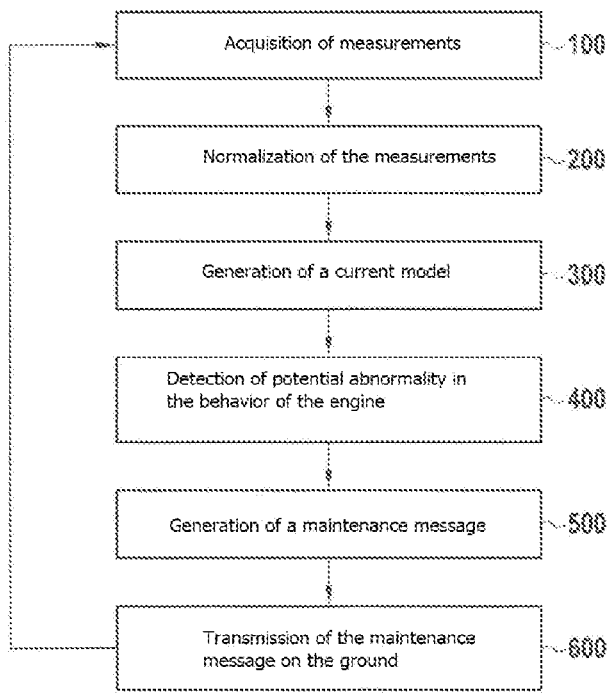
FIG. 2 represents a flowchart of one mode of implementation of a monitoring method according to the invention of the engine during a flight mission of the aircraft.

FIG. 2 represents a flowchart of one mode of implementation of the engine monitoring method during an aircraft flight mission.

The monitoring method includes several steps. In its general principle, the method aims firstly, within the aircraft and via the acquisition means as well as the processing device 12, at acquiring measurements according to said two sets, then applying successive processing operations to these measurements in order to obtain a model of the condition of the engine, model based on which a potential abnormality detection is made and then a proposal for maintenance operations aimed at correcting or preventing the abnormality. Finally, this proposal for maintenance operations, in particular, is transmitted to the ground towards the receiving device 14.

To this end, the monitoring method firstly includes a step 100 of acquiring measurements according to said two sets. Such step 100 is implemented by the acquisition means 11, therefore on board the aircraft during the flight mission.

In one particular mode of implementation, the measurements are acquired during a predetermined phase of the flight mission.

For example, said predetermined phase corresponds to take-off, landing, taxi before take-off or cruising phase.

According to another example, the predetermined phase corresponds to a time range comprised in the phases mentioned above, and during which particular operating conditions are targeted, such as for example iso-speed, iso-altitude conditions, etc.

However, it is not excluded to consider an acquisition of measurements during several predetermined phases of the flight mission of the aircraft. For example, the measurements can be made recurrently throughout said flight mission or, according to another example, only during a time range smaller than the total duration of the flight mission and straddling one or more predetermined flight phases.

According to yet another example, the acquisitions can be made in several phases which are not consecutive, such as take-off and landing, for example. In short, no limitation is related to the phases of the flight mission as well as to the considered acquisition period.

Thus, at the end of the acquisition step 100, there are two sets of measurements which have been acquired over time during the flight mission of the aircraft. These two sets of measurements are then transmitted to the processing device 12, where they are stored in order to be processed.

It should be noted that these acquisitions are conventionally made according to a predetermined time step. For example, said time step is constant, so that the acquisition of the measurements is periodic. Alternatively, said time step is variable throughout the flight mission, or only during one of the phases of the flight mission in the case where several phases are considered.

The monitoring method then includes a step 200 of normalizing the measurements of the first set relative to the measurements of the second set. This step 200 is implemented by the processing device 12, therefore on board the aircraft during the flight mission.

Such normalization step 200 allows obtaining normalized measurements, that is to say measurements reduced to one and the same acquisition context, so as to be able to compare them easily and in a relevant manner. In other words, this normalization step 200 aims at projecting the measurements of the first set into a common comparison reference frame, in order to remove the influence of external conditions and setpoints on the endogenous variables describing the condition of the engine. It is indeed understood that the acquisition context, symbolized by the measurements of the second set, has an influence on the measurements of the first set, so that it is difficult, and also not very relevant, to compare with each other the raw measurements derived from step 100.

In one particular mode of implementation, the normalization step 200 includes first of all a filtering of the measurements of the first set, so as to remove outlier measurements located outside respective predetermined intervals. Such filtering advantageously allows making the measurements of the first set more reliable, and therefore ultimately making the whole monitoring method more reliable.

Alternatively, or in addition to said filtering of measurements, it is also possible to envisage a selection of the measurements from the first set, such as for example a selection made by an operator.

It is therefore understood that each endogenous variable, for which measurements then classified in the first set are acquired, is associated with an interval corresponding to a range of values defined by two extreme bounds, a lower bound and an upper bound. These extreme bounds correspond to a physical reality estimated empirically, such as for example the field of operation of the engine, the aging of the engine, etc. Such estimation can be obtained, for example, using a previously acquired expertise. Alternatively, it can be a theoretically estimated reality, for example using numerical simulations made from a numerical modeling of the engine.

In this particular mode of implementation, a deleted outlier measurement is replaced by a default measurement. In this way, no missing measurements can be noted in the time evaluation of the condition of the engine, which allows accurately monitoring the latter.

For example, such default measurement corresponds to the measurement that precedes it in time.

According to another example, such default measurement is obtained by interpolation of measurements framing in time said outlier measurement.

In one alternative implementation, each outlier measurement is deleted without being replaced.

In general, the choice between a replacement of an outlier measurement by a default measurement and the definitive elimination of said outlier measurement is made based on different parameters, such as for example a time deviation between the measurements acquired in the first set. It is indeed understood that the smaller this time deviation, the more measurements are acquired, and therefore the easier it is to do without one or more measurements deemed to be outlier measurements without compromising accurate monitoring of the engine.

Once the filtering has been made, the step 200 includes a normalization of the filtered measurements of the first set relative to the measurements of the second set. This normalization is for example implemented according to a regression model.

It should be noted that the way in which the normalization is actually implemented does not depend on the filtering made previously. Thus, the choice of a filtering upstream of the normalization of the measurements constitutes only one variant of implementation of the invention. It is indeed quite possible to implement, first of all, a normalization of the data of the first set relative to the data of the second set, and, only then, to make a filtering of the normalized data.

In addition, it is also not excluded to keep all the acquired measurements and therefore that no filtering is made. Where appropriate, it is nevertheless possible to assign a validity status to each acquired measurement, in order to be able to judge the relevance of the evaluation of the condition of the engine. Such statuses are for example assigned to the measurements acquired directly by the acquisition means, or by the processing device 12.

Once the normalized measurements have been obtained, the method then includes a step 300 of generating a current model representative of the time evolution of the behavior of the engine based on the normalized measurements. This step 300 is implemented by the processing device 12, therefore on board the aircraft during the flight mission.

Conventionally, such current model corresponds to a collection of sub-models, each sub-model describing the time evolution of an endogenous variable from the normalized measurements associated with this endogenous variable. Thus, it is therefore possible to give a visual representation of these sub-models, and therefore ultimately of the current model, by plotting in graphs the evolution of the endogenous variables respectively associated with said sub-models.

It is thus understood that the multidimensional nature, as mentioned previously, of the first and second sets of measurements acquired during step 100 also imply that the current model can be seen as a multidimensional set.

The monitoring method then includes a step 400 of detecting at least one potential abnormality in the behavior of the engine based on a comparison of the current model with a predefined reference model representative of the behavior of the engine free of an abnormality. This step 400 is implemented by the processing device 12, therefore on board the aircraft during the flight mission.

"At least one abnormality" refers here to at least one abnormality related to a divergence between a sub-model, related to an endogenous variable and derived from the current model, with the corresponding sub-model of the reference model. Also, it is well understood that divergences are likely to exist for several sub-models of the current model, so that several potential abnormalities are detected.

However, and as mentioned above, the current and reference models can be seen as multidimensional models. Consequently, the term "abnormality" can also be used to mean a general malfunction of the engine, in the sense of a malfunction corresponding to one or more local abnormalities respectively observed in the sub-models related to the endogenous variables.

Concretely, and for illustrative purposes only, it is assumed that a divergence relative to an expected fuel flow rate level as well as a divergence relative to an expected oil temperature are observed. Therefore, it is perfectly equivalent to consider that two abnormalities in the behavior of the engine have been detected, if it is sought to describe the engine locally, or that only one abnormality in the behavior of the engine has been detected, if it is sought to describe the engine globally, the global abnormality then corresponding to the grouping of the two local abnormalities.

The comparison of the current model with the reference model thus allows tracking the evolution of the behavior of the engine, and therefore of its condition, even of its possible degradation over time.

The reference model has a structure identical to that of the current model, so that they can be compared with each other. Consequently, the reference model also includes sub-models respectively associated with endogenous variables identical to those considered for the current model.

For example, the reference model was determined based on M current models obtained during flight missions prior to the considered flight mission and during which no abnormality has been detected, M being a number greater than or equal to 1. Thus, according to this example, current models have been previously generated, preferably from the start-up of the engine, this start-up being, with some exceptions, considered free of abnormal operation. The generation of these previous current models is for example obtained by means of model acquisition 100, normalization 200 and generation 300 steps as described above. It will therefore be understood that these previous current models were generated based on measurements acquired during phases of the flight mission identical to those considered for the invention, so that the reference model can be compared easily, and especially in a relevant manner, with the current model of the invention.

Preferably, the number M of previous current models considered is strictly greater than 1. In this case, the reference model is for example determined as a function of a mean, a median or a weighting of said M previous current models. In other words, for each endogenous variable, a mean, a median or a weighting of the measurements associated with this endogenous variable and contained in each of the M previous current models are made.

"Weighting" refers here to the fact of assigning weights in the form of numerical coefficients to the measurements of the considered endogenous variable. It should be noted that the term "weighting" also covers the case where part of these weights are zero, so that only part of said M current models is ultimately taken into account in determining the reference model.

It is therefore, for an endogenous variable, a mean, a median or a weighting made among the M sub-models associated with it. It should be noted that the fact of considering a number M strictly greater than 1 advantageously allows taking into account the aging of the engine as long as the latter is intact, and therefore having a reference model that finely models the evolution of the engine condition.

However, it is not excluded to consider a number M equal to 1, that is to say a single previous current model therefore forming on its own the reference model. It is then noted that the choice between a number M equal to 1 or greater than 1 results, in particular, from a compromise between necessary computational resources and accuracy in the modeling of the behavior, including the aging, of an intact engine.

In one particular mode of implementation, and in order to make said detection of at least one potential abnormality, step 400 includes:
   a determination of a trend of evolution of the current model: "trend of evolution" refers here to a projection over time of the evolution of the current model, that is to say of each of the sub-models that compose it. Concretely, it relates here to anticipating over a predetermined time horizon the evolution of the normalized measurements associated with the endogenous variables. Such anticipation can be determined according to one or more dedicated statistical analysis methods, or by taking into account a theoretical aging slope. It is noted that, from a graphical point of view, the trend of evolution of an endogenous variable corresponds to an extension of its trajectory in its graph of evolution over said time horizon;

a comparison of the trend of evolution of the current model with the time evolution of the reference model, so as to identify a potential deviation of the current model with the reference model: such comparison is implemented by comparing, for each endogenous variable, the trend of evolution of the latter with the corresponding evolution contained in a sub-model of the reference model. It is noted that it is possible to observe, for each endogenous variable of the current model, a deviation with the corresponding sub-model of the reference model. Also, when several deviations of this type are observed, the deviation associated with the reference model as a whole can be represented in the form of a vector whose components are representative of the deviations associated with each endogenous variable;

a detection of abnormality based on said potential deviation: when a deviation has been identified, the detection of abnormality is made based on the amplitude of said deviation. For this purpose, the amplitude of the deviation is compared with a threshold value, this threshold value being able to correspond to a vector of scalars where appropriate, for example based on a maximum rate of false detections to be reached.

This mode of implementation is advantageous because it allows, thanks to the determination of the trend of evolution of the current model, detecting potential future abnormalities. In other words, it allows the method to be part of a framework of predictive maintenance.

However it is not excluded, according to other examples not detailed here, to have a detection of at least one potential abnormality which is not based on a determination of a trend of evolution of the current model. Thus, it is possible to envisage comparing the current model with the reference model only from the normalized measurements as obtained once the acquisition is complete, that is to say without forecasting the evolution of the current model. In this case, the term "potential" remains appropriate to designate a possibly already existing abnormality.

According to an exemplary implementation, an alert is issued when an abnormality is detected. Such alert corresponds for example to a sound signal, to a light signal, etc., this signal being transmitted to the receiving device 14 on the ground, or also to the cockpit of the aircraft in order to alert the flight crew.

It is noted that an alert is not necessarily issued each time an abnormality is detected. For example, an alert is issued after a predetermined number of occurrences of the abnormality, which may be the case if the monitoring method is executed several times during the flight mission of the aircraft, or if several flight missions are considered with at least one execution of the monitoring method for each of these missions.

The monitoring method then includes, if an abnormality is detected, a step 500 of generating a maintenance message including an alert based on the abnormality detected as well as maintenance recommendations or maintenance operations associated with said alert. This step 500 is implemented by the processing device 12, therefore on board the aircraft during the flight mission.

It should be noted that the maintenance operations contained in the maintenance message can, according to an exemplary implementation, be compulsory. In other words, these maintenance operations may be associated with an implementation constraint typically imposed by the company manufacturing the engine on a company in charge of operating this engine.

In this way, it is possible to aggregate in the same message, for example in the form of a maintenance report, all the information necessary for a maintenance operator, such as the nature of the abnormality, the maintenance operations to be implemented, and advantageously the equipment necessary to treat the abnormality, etc. This operator can therefore repair an actual abnormality, or make adjustments in order to anticipate a future abnormality.

In a more particular exemplary implementation, beyond the information relating to a detected abnormality (type of abnormality, location of the abnormality, etc.), the message also comprises one or more of the following information (which may be included in said maintenance report): an identifier of the aircraft, an identifier of the engine, context information derived from the measurements of the second set acquired, information relating to maintenance operations which has been conducted previously, etc. The maintenance message may also comprise (for example by incorporation into said maintenance report) information relating to a commercial contract binding the engine manufacturer to the aircraft manufacturer for the considered engine, as well as the current model.

It should be noted that the maintenance message can be generated even though no maintenance operation is proposed, for example in the case where no abnormality has been detected during step 400. In this case, said maintenance message only includes the current model, the latter advantageously allowing the engine manufacturer and/or the aircraft manufacturer to track the condition of the engine over time, for example by archiving it.

Then, the monitoring method includes a step 600 of transmitting the maintenance message to at least the receiving device 14 on the ground.

As mentioned previously, the receiving device 14 on the ground is for example chosen at least among: a PC, a Smartphone, a tablet, a drone, augmented reality glasses, and is held by a maintenance operator belonging to the engine manufacturer.

It is not excluded to transmit the maintenance message to a plurality of receiving devices of this type. It is also not excluded to transmit the maintenance message to a ground station belonging to the aircraft manufacturer, in which case the ground station typically includes a PC receiving said report.

In one particular mode of implementation, the maintenance message is also transmitted to display means of the aircraft cockpit. In this way, the flight crew can take note of the content of the message as well as any recommended maintenance operations.

Examples of cases of application of the monitoring method are given below for purely illustrative purposes and without limitation:

according to a first example, the monitoring system 10 has detected a clogging so of a filter, for example an oil filter. It is predictive detection, so before an operational impact occurs, so that the aircraft can continue to fly. The processing device 12 alerts the receiving device 14 on the ground with a maintenance message requesting the replacement of the clogged filter with sufficient time limit to allow a planning of the operation and thus minimize the immobilization of the aircraft;

according to a second example, the monitoring system 10 has detected a foreign body (also called FOD for Foreign Object Debris or Foreign Object Damage) from a monitoring of the blades of a fan of the turbine engine. The maintenance message transmitted to the ground then includes the repairs that will be necessary at the destination airport. Thus, when the aircraft arrives at its destination, substitution blades as well as engine rebalancing elements will be ready in order to speed up the intervention. It should be noted that the monitoring system 10 can advantageously notify the airport directly in order to provide for a site dedicated to the intervention;

according to a third example, the monitoring system 10 has detected mechanical clearances at the blade tips. The maintenance message is transmitted to the ground on a PC of a maintenance operator, allowing him to target on which stage of the engine he must perform an endoscopy. Advantageously, the maintenance operations are also transmitted on virtual reality glasses worn by the operator so that her can visualize the procedure to be followed upstream of the actual intervention on the engine.

Figure 3:
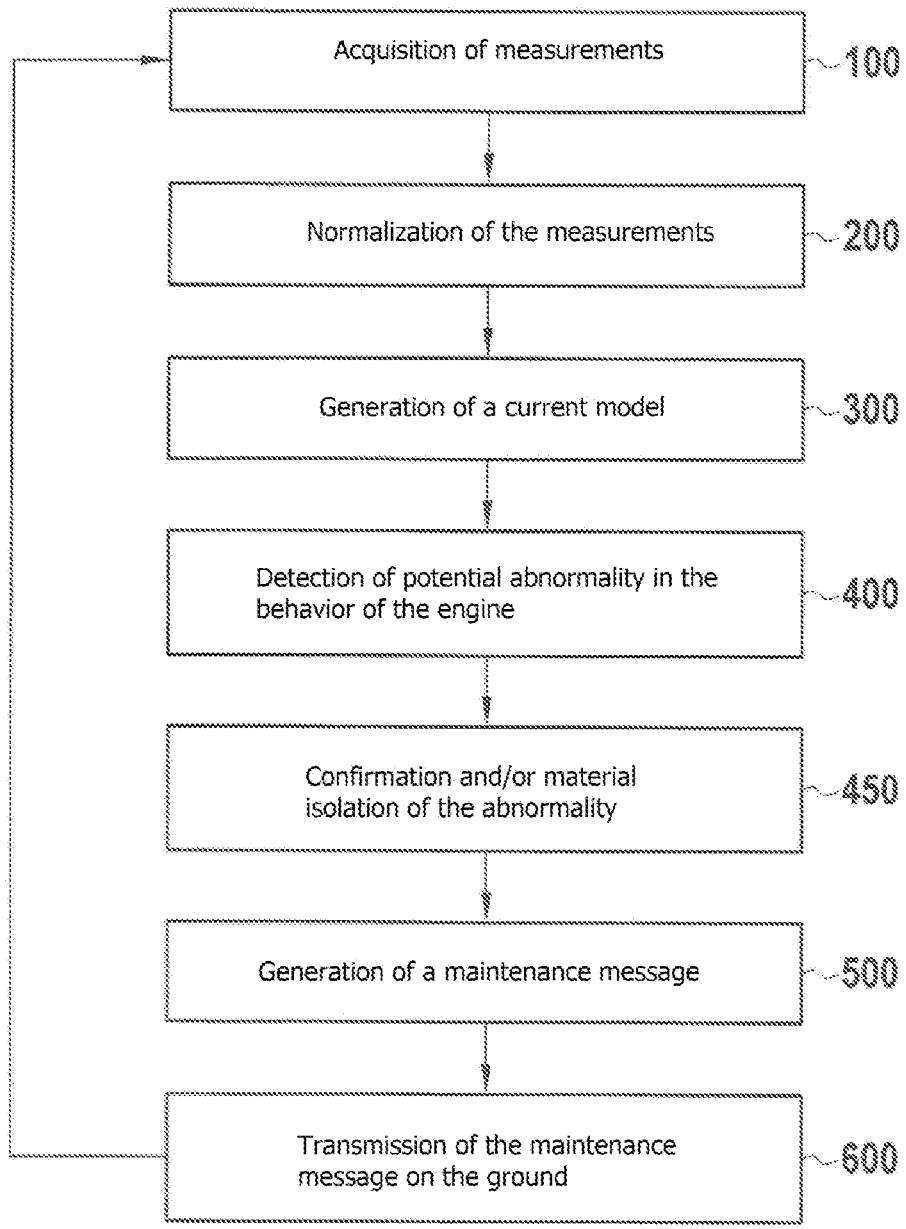
FIG. 3 represents one particular mode of implementation according to the invention of the method of FIG. 2 during which, when an abnormality is detected, the method includes a step of confirming and/or materially isolating said abnormality.

FIG. 3 represents one particular mode of implementation of the method of FIG. 2 during which, when an abnormality is detected, the method includes a step 450 of confirming and/or materially isolating said abnormality.

As illustrated in FIG. 3, the step 450 of confirming and/or materially isolating said abnormality is carried out before the generation of the maintenance message. This step 450 comprises exchanges of information relating to the current model between the aircraft and an entity on the ground.

In this mode of implementation, the exchanges take place between the processing device 12 and said entity on the ground.

For example, the entity on the ground is a PC-type device, held and handled by a maintenance operator belonging to the engine manufacturer, and including means of communication with the aircraft to receive the determined current model. It is not excluded that said entity on the ground is mixed up with said receiving device 14 on the ground.

Upon receiving said current model, the maintenance operator can consult a catalog listing degradation signatures, for example stored in a memory of the PC-type device he is handling, to confirm the detected abnormality, or trigger a failure isolation procedure in case of ambiguity on the material element(s) responsible for the abnormality detected.

Once the abnormality has been confirmed or specified by the maintenance operator, the latter can send back the information concerning the abnormality, via the communication means of the device he is handling, to the processing device 12, so that this information appears in the maintenance message (for example by incorporation into said maintenance report) which will be generated during step 500.

Figure 4:
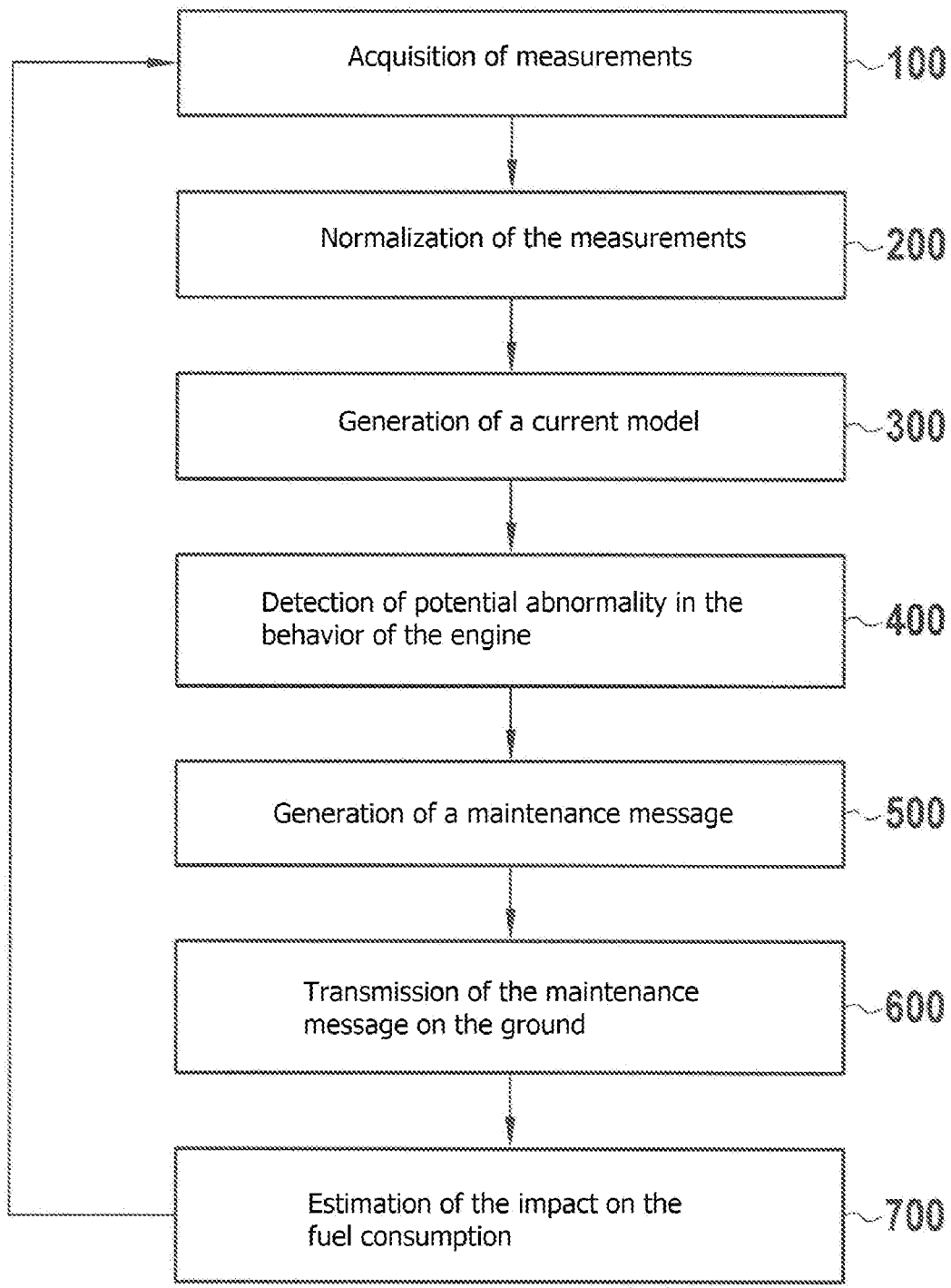
FIG. 4 represents one particular mode of implementation according to the invention of the method of FIG. 2 during which, when an abnormality has been detected and when a report including at least one maintenance operation relating to said abnormality has been generated, the method includes a step of estimating the impact of the absence of tracking of said maintenance operation on the engine fuel consumption.

FIG. 4 represents a particular mode of implementation of the method of FIG. 2 during which, when an abnormality has been detected and a when report including at least one maintenance operation relating to said abnormality has been generated, a step 700 of estimating the impact of absence of tracking of said maintenance operation on the fuel consumption of the engine is carried out.

As illustrated in FIG. 4, the estimation step 700 is carried out after the maintenance message has been transmitted to the receiving device 14 on the ground. In other words, the estimation made constitutes additional information transmitted separately from the maintenance message.

However, it is not excluded to consider that the estimation step 700 is carried out after the generation of the report but before its transmission. In this case, the estimation of the impact of the absence of tracking of the maintenance operation on fuel consumption is for example integrated into the maintenance message (even to the maintenance report where appropriate) in an update of the latter.

According to one exemplary implementation, said estimation is made by the processing device 12 during the flight mission. To this end, the processing device 12 executes fuel consumption estimation calculations considering a scenario in which no maintenance operation is applied to treat the detected abnormality.

Said calculations take into consideration a plurality of parameters, such as for example the amount of fuel remaining in the tank of the engine, an average fuel consumption recorded in a technical documentation associated with the engine, and the like.

This estimation is then transmitted to the receiving device 14 on the ground, where a maintenance operator determines whether to actually envisage the maintenance operation as recommended in the maintenance message. In other words, the estimation determined during step 700 constitutes decision support for the maintenance operator.

As an alternative, or in addition to a transmission to the receiving device 14 on the ground, said estimation is transmitted to the cockpit so as to inform the flight crew who can therefore assess the severity of the abnormality, and therefore make decisions accordingly, such as a modification of the trajectory of the airplane, a reduction of the engine speed, etc. It is indeed understood that the estimation obtained in step 700 constitutes easily understandable and interpretable information.

According to another exemplary implementation, the estimation of the impact of the absence of tracking of the maintenance operation on the fuel consumption is made by a fuel pump integrated into the engine. In this example, said pump includes processing means configured to perform calculations of the estimation. The pump further includes wired or wireless communication means configured to transmit the estimation to the receiving device 14 on the ground and/or the cockpit and/or the processing device 12.

It should be noted that the mode of implementation of FIG. 4 can be combined with all the modes of implementation previously mentioned, such as for example that of FIG. 3.

More generally, it should be noted that all the modes of implementation considered above have been described by way of non-limiting examples, and that other variants can therefore be envisaged.

In particular, the invention has been described by considering a monitoring of one of the engines of the pair integrated into the aircraft. It will clearly appear that such monitoring applies identically to the other engine of the aircraft, for example by means of a processing device 12 common to said engines of the pair, or by means of two respective processing devices of said engines. In other words, at least the steps of acquiring 100, normalizing 200, generating 300 a current model, of detecting 400 potential abnormalities, of generating 500 a maintenance message and of transmitting 600 said report are executed for each engine of the pair. Of course, the steps described in FIGS. 3 and 4 can also be executed for each of the engines of the pair.

More broadly, no limitation is related to the number of engines fitted to the aircraft nor to the number of processing devices 12 associated with these engines. No limitation is related to the way in which the respective monitoring operations of the engines are performed. For example, these respective monitoring operations are advantageously performed in parallel, so as to monitor the engines simultaneously. However, it is not excluded to consider sequential monitoring operations of each of the engines.

Furthermore, when the aircraft includes at least one pair of identical engines, the step 400 of detecting a potential abnormality associated with an engine can advantageously include a comparison of the current models respectively associated with the engines of the pair. A method in this way allows for a cross-monitoring of the behaviors of the engines of the pair. However, since these engines are identical, it is expected that their respective behaviors will also be identical during the flight mission. Consequently, the fact of comparing the respective current models of the engines with each other allows increasing the reliability of the final diagnosis provided in the maintenance messages for each of the engines.

For example, the comparison of the current model of a first engine with the current model of a second engine of the pair is made after the comparison of the current model of the first engine with the reference model. Alternatively, the cross comparison between the respective current models of the engines is made before any comparison with a reference model.

In addition, the present monitoring method has been described considering that the steps of normalizing 200, generating 300 a current model, of detecting 400 potential abnormalities, of generating 500 a maintenance message and of transmitting 600 said report were executed after measurements had been acquired during a flight mission of the aircraft.

However it is not excluded to consider other modes of implementation of the monitoring method. For example, it is possible to consider that at least the steps of normalizing 200, generating 300 a current model and of detecting 400 at least one potential abnormality are iterated for each acquisition of a measurement of at least the first set. The possible detected abnormalities can thus be stored and then grouped together in a single maintenance message transmitted to the ground.

In a complementary manner, step 500 of generating a maintenance message can also be executed for each acquisition of a measurement of at least the first set.

In another mode of implementation, a plurality of flight missions are considered. In other words, it is provided that the monitoring method is executed during each of said flight missions. Furthermore, in this mode, the measurements of the first and second sets associated with a flight mission are acquired during at least one predetermined phase common to said plurality of flight missions. Such procedure allows harmonizing the measurement acquisition context, thus facilitating the tracking of the condition of the engine from flight to flight. In other words, the fact of targeting at least one predetermined phase of the flight mission allows creating a repeatable context between different flight missions of the aircraft. By way of non-limiting example, for each flight mission, the measurements are acquired during take-off and landing.

In yet another mode of implementation, the monitoring method is executed periodically every N flight missions, N being a number greater than or equal to 1. For example, the method is executed every five flight missions, each time during the same phase of the mission. It is further understood that if N is equal to 1, this means that the method is executed on each flight mission of the aircraft.

The choice between these execution modes results, in particular, from a compromise between computational resources (the smaller the time step between each acquisition, the greater the computational resources to be considered) and the desired monitoring frequency.

Finally, the invention as described above in no way excludes the possibility of implementation of an additional monitoring system including a ground processing device. In this case, this additional monitoring system includes acquisition means on board the aircraft, advantageously common to those of the invention, the acquired measurements then being transmitted to the ground in order to be processed. The fact of using an additional monitoring system of this type constitutes a safety measure in the case where the processing device on board the aircraft experiences a failure.

The invention claimed is:

1. A method for monitoring at least one aircraft engine, said method including, during at least one flight mission of the aircraft, a step of acquiring measurements according to two sets, a first set of measurements of endogenous variables representative of the behavior of the engine, and a second set of measurements of exogenous variables representative of the acquisition context, said method being characterized in that it further includes, during the flight mission, the following steps:
   a step of normalizing the measurements of the first set relative to the measurements of the second set,
   a step of generating a current model representative of the time evolution of the behavior of the engine based on the normalized measurements,
   a step of detecting at least one potential abnormality in the behavior of the engine based on a comparison of the current model with a predefined reference model representative of the behavior of the engine free of abnormality, and
   if an abnormality is detected, a step of generating a maintenance message including an alert based on the detected abnormality as well as maintenance recommendations or maintenance operations associated with said alert,
   a step of transmitting the maintenance message to at least one receiving device on the ground,
   the steps of acquiring, normalizing, generating a current model, of detecting and generating a maintenance message being carried out on board the aircraft.

2. The method according to claim 1, wherein the normalization step includes:
   a selection and/or a filtering of the measurements of the first set, so as to remove outlier measurements located outside predetermined respective intervals,
   a normalization of the filtered measurements of the first set relative to the measurements of the second set.

3. The method according to claim 1, wherein the reference model has been determined based on M current models obtained during flight missions prior to the considered flight mission and during which no abnormality has been detected, for example during flight missions following the set-up of the engine, M being a number greater than or equal to 1.

4. The method according to claim 3, wherein, when M is strictly greater than 1, the reference model is determined based on a mean, a median or a weighting of said M previous current models.

5. The method according to claim 1, wherein the step of detecting at least one potential abnormality includes:
- a determination of a trend of evolution of the current model,
- a comparison of the trend of evolution of the current model with the time evolution of the reference model, so as to identify a potential deviation of the current model with the reference model,
- a detection of at least one abnormality based on said potential deviation.

6. The method according to claim 1, wherein, when an abnormality is detected, said method includes, before the generation of the maintenance message, a step of confirming and/or materially isolating said abnormality comprising exchanges of information relating to the current model between the aircraft and an entity on the ground.

7. The method according to claim 1, wherein the receiving device on the ground is chosen among at least: a PC, a smartphone, a tablet, a drone, or augmented reality glasses.

8. The method according to claim 1, wherein the maintenance message is also transmitted to display means of the cockpit of the aircraft.

9. The method according to claim 1, said method including, when an abnormality has been detected and when a message including at least one maintenance operation relating to said abnormality has been generated, a step of estimating the impact of the absence of tracking said maintenance operation on the fuel consumption of the engine.

10. The method according to claim 1, wherein at least the steps of normalizing, generating a current model and of detecting at least one potential abnormality are iterated for each acquisition of a measurement of at least the first set.

11. The method according to claim 1, wherein a plurality of flight missions is considered, the measurements of the first and second sets associated with a flight mission being acquired during at least one predetermined phase common to said plurality of flight missions.

12. The method according to claim 1, said method being executed periodically every N flight missions, N being a number greater than or equal to 1.

13. The method according to claim 1, wherein the aircraft includes at least one pair of identical engines, at least the steps of acquiring, normalizing, generating a current model, of detecting at least one potential abnormality, of generating a maintenance message and of transmitting said message being executed for each engine of the pair, the step of detecting at least one potential abnormality associated with an engine further including a comparison of the current models respectively associated with the engines of the pair.

14. A computer program including a set of program code instructions which, when executed by a processor, configure said processor to implement steps of normalizing, generating a current model, of detecting at least one potential abnormality and of generating a maintenance message of a monitoring method according to claim 1.

15. A computer-readable recording medium on which a computer program according to claim 14 is recorded.

16. A processing device intended to be on board an aircraft including acquisition means configured to acquire, during at least one flight mission, measurements according to two sets, a first set of measurements of endogenous variables representative of the behavior of an engine of the aircraft, and a second set of measurements of exogenous variables representative of the acquisition context, said processing device including:
- a normalization module configured to normalize the measurements of the first set relative to the measurements of the second set,
- a generation module configured to generate a current model representative of the time evolution of the behavior of the engine based on the normalized measurements,
- a detection module configured to detect at least one potential abnormality in the behavior of the engine based on a comparison of the current model with a predefined reference model representative of the behavior of the engine free of abnormality,
- a generation module configured to generate a maintenance message including an alert based on a detected abnormality as well as maintenance recommendations or maintenance operations associated with said alert.

17. A system for monitoring at least one aircraft engine, said system including:
- acquisition means intended to be on board the aircraft and configured to acquire, during at least one flight mission, measurements according to two sets, a first set of measurements of endogenous variables representative of the behavior of the engine, and a second set of measurements of exogenous variables representative of the acquisition context,
- a processing device according to claim 16,
- at least one receiving device on the ground,
- communication means configured to at least transmit a maintenance message generated by the processing device to the receiving device on the ground.

18. An aircraft including:
- acquisition means configured to acquire, during at least one flight mission, measurements according to two sets, a first set of measurements of endogenous variables representative of the behavior of the engine, and a second set of measurements of exogenous variables representative of the acquisition context,
- a processing device according to claim 16,
- communication means configured to at least transmit a maintenance message generated by the processing device to at least one receiving device on the ground.

* * * * *